(12) United States Patent
Collins

(10) Patent No.: US 8,734,641 B2
(45) Date of Patent: May 27, 2014

(54) TERTIARY WASTEWATER FILTRATION USING INCLINED FILTER MEDIA AND INTERNAL REVERSE FLOW BACKWASHING OF FILTER DISKS

(76) Inventor: Anthony Collins, Pompano Beach, FL (US)

(*) Notice: Subject to any disclaimer, the term of this patent is extended or adjusted under 35 U.S.C. 154(b) by 691 days.

(21) Appl. No.: 12/877,514

(22) Filed: Sep. 8, 2010

(65) Prior Publication Data
US 2012/0055858 A1 Mar. 8, 2012

(51) Int. Cl.
*B01D 29/66* (2006.01)

(52) U.S. Cl.
USPC ...... 210/108; 210/411; 210/413; 210/333.01; 210/346

(58) Field of Classification Search
None
See application file for complete search history.

(56) References Cited

U.S. PATENT DOCUMENTS

| | | | |
|---|---|---|---|
| 1,381,944 A * | 6/1921 | Sweetland | 210/333.01 |
| 1,833,315 A | 11/1931 | Burhans | |
| 2,780,364 A * | 2/1957 | Teatini | 210/333.01 |
| 3,231,490 A | 1/1966 | Fry | |
| 3,617,541 A | 11/1971 | Pan | |
| 4,090,965 A | 5/1978 | Fuchs | |
| 4,167,482 A | 9/1979 | Muller | |
| 4,219,420 A | 8/1980 | Muller | |
| 4,439,323 A | 3/1984 | Ball | |
| 4,639,315 A | 1/1987 | Fuchs et al. | |
| 4,725,292 A | 2/1988 | Williams | |
| 4,869,823 A | 9/1989 | Otani et al. | |
| 5,374,360 A | 12/1994 | Weis | |
| 5,480,561 A | 1/1996 | Ball et al. | |
| 5,560,835 A | 10/1996 | Williams | |
| 5,639,371 A | 6/1997 | Loy et al. | |
| 5,698,102 A | 12/1997 | Khudenko | |
| 5,811,011 A | 9/1998 | Ciszczon et al. | |
| 5,876,612 A | 3/1999 | Astrom | |
| 6,029,479 A * | 2/2000 | Pattee | 68/18 F |

(Continued)

FOREIGN PATENT DOCUMENTS

| | | | |
|---|---|---|---|
| NL | 8103750 | | 8/1981 |
| SU | 858879 B | * | 8/1981 |

OTHER PUBLICATIONS

Parkinson Corporation, Dynadisc Cloth Media Filter, Informational/Marketing/Sales Brochure, 2009, 4 pages, Published in United States.

*Primary Examiner* — Terry Cecil
(74) *Attorney, Agent, or Firm* — Mark D. Bowen; Malin Haley DiMaggio & Bowen, P.A.

(57) ABSTRACT

A wastewater tertiary media filtration system capable of enhancing filtration performance while including backwashing capabilities that eliminate turbidity spikes by using compressed fluid injected to the interior of submerged includes a filter tank having an inlet and an outlet with a plurality of pile cloth media filter disks disposed in generally parallel relation between the inlet and outlet. Each filter disk preferably includes opposing filter panels disposed in generally parallel spaced relation and supported by a frame. The filter disks may be angularly disposed at approximately 55-degrees relative to horizontal so as to maximize settlement velocity in accordance with the advantages of inclined plate technology. Backwashing is primarily accomplished by injecting compressed fluid (such as air) to the interior of each filter disk assembly whereby accumulated solids are blown off of the cloth filter media by reverse flow. Injecting a compressed fluid medium into the interior of each filter disk assembly increases the internal pressure within each filter disk thereby avoiding turbidity spikes associated with externally applied suction backwash systems of the background art.

8 Claims, 7 Drawing Sheets

(56) References Cited

U.S. PATENT DOCUMENTS

| | | |
|---|---|---|
| 6,090,298 A | 7/2000 | Weis |
| 6,103,132 A | 8/2000 | Seyfried et al. |
| 6,294,098 B1 | 9/2001 | Bergmann |
| 6,505,744 B1 * | 1/2003 | Geaugey et al. ............ 210/410 |
| 6,540,920 B2 | 4/2003 | Bounds et al. |
| 6,776,295 B2 | 8/2004 | Morimura |
| 6,858,140 B2 | 2/2005 | Smith et al. |
| 7,323,108 B1 | 1/2008 | Garbett et al. |
| 7,537,689 B2 | 5/2009 | Ricketts |
| 7,572,383 B2 | 8/2009 | Dew, Jr. |
| 2005/0139557 A1 | 6/2005 | Ricketts |

* cited by examiner

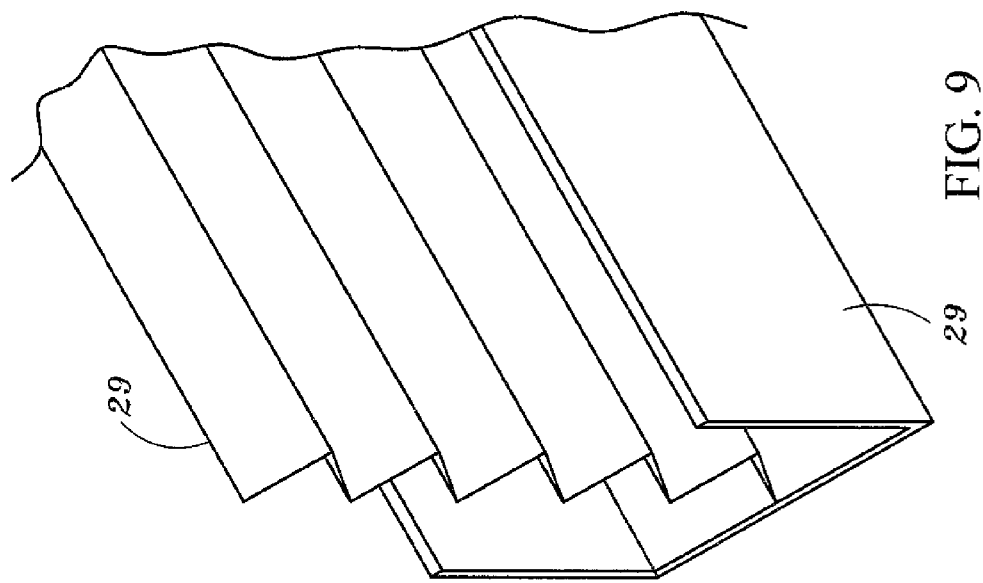
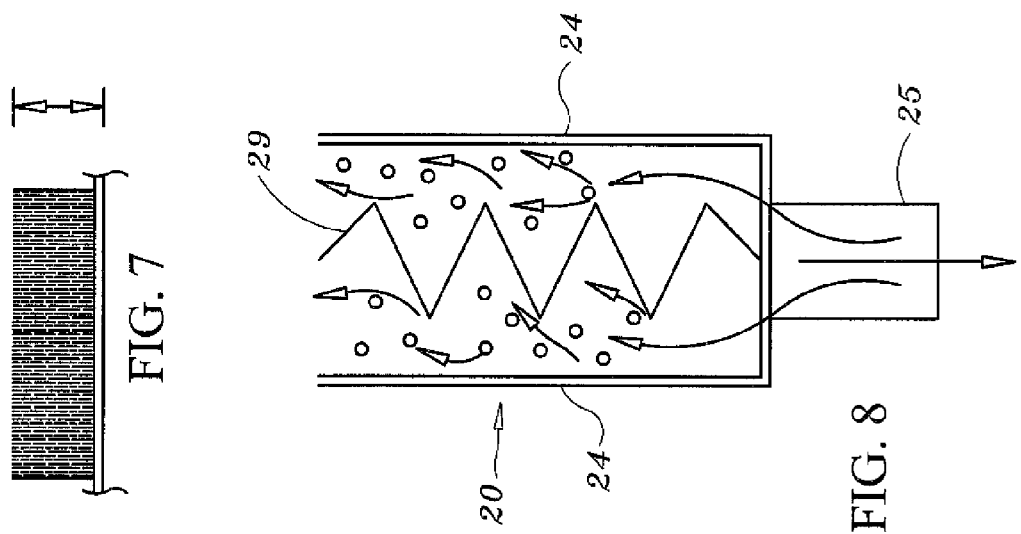

TERTIARY WASTEWATER FILTRATION USING INCLINED FILTER MEDIA AND INTERNAL REVERSE FLOW BACKWASHING OF FILTER DISKS

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention generally relates to wastewater treatment apparatus and processes, and more particularly to an apparatus and method for filtering suspended solids from liquid effluent during a tertiary filtration phase in wastewater and sewage treatment applications.

2. Description of Related Art

Sewage and wastewater treatment generally refers to the process of removing contaminants from wastewater. Sewage is created by residences, institutions, hospitals, and industrial facilities, and includes household waste disposed of via sewers. Sewage is typically collected and transported via a network of pipes to sewage treatment plants wherein physical, chemical, and biological processes are employed to remove contaminants.

Modern sewage treatment involves three stages, namely, primary, secondary, and tertiary treatment. Primary treatment generally involves temporary retention of the sewage in a basin to allow heavy solids to settle to the bottom while oil, grease, and lighter solids float to the surface. In the primary sedimentation stage, sewage flows through large tanks, commonly called "primary clarifiers" or "primary sedimentation tanks." Settled and floating substances are removed and the remaining liquid is subjected to secondary treatment. The secondary treatment stage degrades the biological content of the sewage. The majority of municipal sewage treatment plants treat the settled sewage liquor using aerobic biological processes, such as the use of water-borne micro-organisms to remove dissolved and suspended biological matter. Biological treated waters flow to a secondary sedimentation stage for clarification. Tertiary treatment involves final treatment stages that raise the effluent quality prior to discharge to the receiving environment, typically achieving water quality of 25-30 parts per million of total suspended solids (TSS). More than one tertiary treatment process may be used at any treatment plant.

Gravity settler tanks and clarifiers have long been used in sewage and wastewater treatment to separate solids from liquids in effluent streams in tertiary treatment applications. One particular type of settler tank known in the art is characterized as having a series of inclined solid plates that function to increase the settlement velocity thereby enhancing the efficiency at which flocculated material precipitates from water. One such brand of inclined plate technology is branded under the trademark LAMELLA®, a registered trademark of Parkson Corporation, Fort Lauderdale, Fla. So called, LAMELLA clarifiers receive influent that flows upward over an array of inclined parallel solid plates whereby solids tend to settle on the plates and eventually slide into a sludge hopper at the bottom of the settler tank. It has been found that use of LAMELLA clarifiers require a smaller surface footprint as compared with conventional clarification equipment to achieve a given solids removal capacity because the inclined plates enhance solids settlability.

Another wastewater treatment technology present in the wastewater treatment art involves the use of porous media filters, such as woven fabric, knitted fabric, gauze, mesh, penetrable membranes etc. These systems are often referred to as disk or drum filtration because they are characterized as having a tank with an inlet and an outlet and filter media disposed between the inlet and the outlet, wherein the filter media typically comprises a cloth media stretched over large drum or disk-type frames. In these systems, liquid influent is filtered upon passing, under hydrostatic pressure, through the porous woven cloth filter media which captures solid particles as the liquid passes through the filter media. Over time filtered particles accumulate on the filter media thereby degrading the effectiveness of the filter. As the filtration process continues, solids accumulating on the filter media will gradually restrict the flow of liquid through the media causing the level within the filter tank to rise. When the level reaches a predetermined level, a backwash process is required to restore filter effectiveness by cleaning the filter media.

The background art reveals a number of attempts to adapt tertiary media filters with systems intended to periodically clean the filter media by removal of accumulated solids. This process is sometimes referred to as "backwashing". There are two primary competing designs for backwashing systems known in the art for use with tertiary media filtration systems. Each tertiary filtration system is generally characterized as having a plurality of filters, typically disk-shaped, submerged in effluent within a tank. The tertiary filtration systems typically have disk-shaped filters disposed generally vertically and supported by a horizontally disposed axel. Each of these competing prior art designs uses a vacuum pump to create suction for vacuum heads disposed externally on each side of each filter disks to remove captured solids from the media. One design is characterized by having filter disks that to rotate while fixed (radially elongate) vacuum heads disposed on opposite sides of the filter remove accumulated solids from the filter media. The other design is characterized by having dynamic vacuum heads that are caused to move across the surfaces of fixed filter disks. An example of such technology is found in Patent Application Publication No. US 2005/0139557, titled Tertiary Filter.

Both the fixed disk/movable vacuum head, and the fixed vacuum head/rotatable disk backwashing technologies, as well as other media filters that incorporate suction backwashing, are burdened with significant disadvantages. Initially, turbidity spikes are experienced during suction backwashing processes. One reason for the turbidity spikes is believed to result from the cleaning of the external surface of the filter which removes significant amounts of deposited particulate matter (i.e. accumulated solids) thereby reducing the effectiveness of the filter for a period time until the accumulation of additional particulate matter raises filtration efficiency to an acceptable level. During the period of reduced effectiveness, flow increases through the recently cleaned portions of the filter thereby allowing an increased amount of solids to pass through. The present inventor has found that it is desirable to leave a suitable amount of accumulated deposited solids on the filter media during the backwashing process so as to maintain filtration efficiency. In addition, the application of an external suction force on the outer surface of the filter media reduces the internal pressure within the filter disk thereby artificially increasing the flow of water through the remaining portions of the filter. The reduced internal pressure and resulting sudden increase in flow results in increased levels of solids passing through the filter during the backwashing process thereby leading to a spike in turbidity corresponding to each backwashing cycle. More particularly, the high suction causes the counter-current condition and allows solids to pass into the clean water volume causing the "cleaning spikes". A further disadvantage with tertiary media filter systems present in the art is that the filter media is configured in generally vertically disposed arrays and thus fail to harness advantages realized by inclined plate technology. Furthermore, the vacuum cleaning heads take up a great deal of space thereby limiting the number of discs per tank. In addition, such systems require substantial energy consumption to power the vacuum cleaning system.

Accordingly, there exists a need for an improved tertiary media filtration system with backwash capabilities that avoids the limitations and disadvantages present in the art.

BRIEF SUMMARY OF THE INVENTION

The present invention overcomes the limitations and disadvantages present in the art by providing an improved wastewater tertiary media filtration system capable of enhancing filtration performance while including backwashing capabilities that eliminate turbidity spikes. The present invention is directed to tertiary wastewater treatment apparatus including a filter tank having an inlet and an outlet with a plurality of pile cloth media filter disks disposed in generally parallel relation between the inlet and outlet. Each filter disk preferably includes opposing filter panels disposed in generally parallel spaced relation and supported by a frame. Each filter panel preferably includes a quantity of pile cloth, or other suitable filtration media, sandwiched between opposing mesh panels. While the filter disks may be generally vertically disposed, the present invention further contemplates use of inclined filter disks such that the system further harnesses the advantages of inclined plate technology to enhance the efficiency of tertiary filtration by maximizing settlement velocity. Each filter frame provides a supporting and sealing structure for maintaining the filter panels in spaced relation and is adapted with an outlet for the output and transport of filtered clean water.

During the filtering process, influent flows into the tank and passes through the pile cloth, or other filter media, on opposing sides of each filter disk while depositing suspended solids on the filter media. The filtered effluent (e.g. "clean" water") flows out from the outlet of each filter disk for discharge or other suitable use. Backwashing is primarily accomplished by injecting compressed fluid (such as air) to the interior of each filter disk assembly whereby accumulated solids are blown off of the cloth filter media by reverse flow. Injecting a compressed fluid medium into the interior of each filter disk assembly increases the internal pressure within each filter disk thereby avoiding turbidity spikes associated with externally applied suction backwash systems of the background art.

A significant aspect of the present invention involves dislodging external solids by the introduction of internal pressure to remove caked accumulated solids from the filter media, thus avoiding the use of inefficient externally applied suction and the disadvantages associated with said backwash systems. A number of significant advantages are realized by the backwashing system of the present invention. First, energy consumption required is significantly less than vacuum systems of the background art due to the elimination of suction pumps and drive motors. Second, the elimination of external vacuum/suction heads and complex mechanics simplifies system design in a smaller package. For example, the combination of solid and liquid sucked into the vacuum head in the prior art systems, referred to as the "reject" requires treatment and is typically piped back to the system inlet thus requiring additional piping, valves, pumps, etc. Third, not only does the system eliminate turbidity spikes, but it leaves a thin film of solids externally that improves filtration efficiency by allowing for the capture of finer particles. The system more gently removes external solids and allows the solids to settle within the tank. This combination provides finer filtration capability enhancing the efficiency of the filter.

The present invention discloses two backwashing system embodiments, each of which relies on the introduction of compressed fluid, such as air, into the interior of each filter disk. In a first embodiment, a fixed baffle is disposed within the filter disk interior and functions to provide agitation of the compressed fluid/filter media. In a second embodiment, compressed air is injected into diffuser floats movably disposed within the filter disks. The air is discharged from the diffuser toward the interior surface of the filter media. The air further renders the diffuser float buoyant such that it may traverse upward thereby exposing substantially the entire face area to discharging gas. Upon completion of the backwashing process, air escape apertures allow for any trapped air to escape thereby rendering the diffuser float non-buoyant whereby the float returns to its original position under the influence of gravity.

Accordingly, it is an object of the present invention to provide an improved wastewater treatment apparatus and method.

Another object of the present invention is to provide such a system wherein backwashing is accomplished using a compressed fluid injected internally to each filter disk.

Still another object of the present invention is to provide such a system wherein filter disks are inclined to increase settlement velocity.

In accordance with these and other objects, which will become apparent hereinafter, the instant invention will now be described with particular reference to the accompanying drawings.

BRIEF DESCRIPTION OF THE SEVERAL VIEWS OF THE DRAWINGS

FIG. 7 is a detail view of a pile cloth fabric filter media;

FIG. 8 is a partial sectional view of an alternate embodiment filter disk assembly adapted with an internal corrugated baffle;

FIG. 9 is a partial sectional perspective view thereof;

DETAILED DESCRIPTION OF THE INVENTION

With reference now to the drawings, FIGS. 1-14 depict and illustrate media filtration apparatus and methods for use in tertiary phase wastewater and sewage treatment applications for providing enhanced filtering performance and improved backwashing technology that eliminates turbidity spikes associated with systems of the background art.

Figure 1:
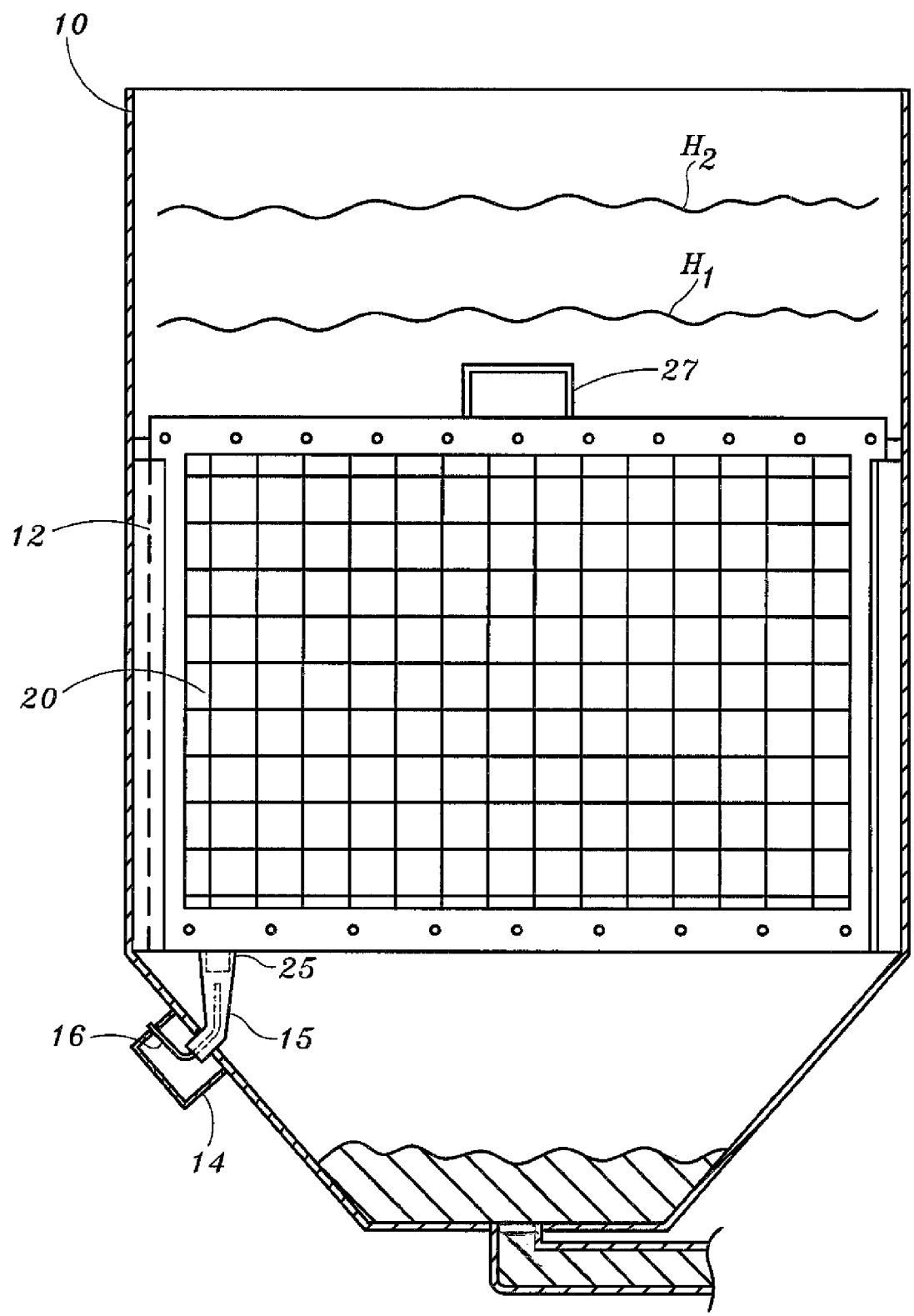
FIG. 1 is a sectional view of a filter tank illustrating a submerged filter disk assembly in an operational configuration.

As generally illustrated in FIG. 1, a filter tank 10 contains a plurality of tertiary media filter disks, generally referenced as 20. Disks 20 are preferably square or generally rectangular, however, any suitable shape is considered within the scope of the present invention. Filter tank 10 includes guide rails 12 within which filter disks 20 are slidably received and retained, and a corresponding plurality of clean water outlet fittings 14 for receiving clean water from each filter disk as more fully discussed herein. During the filtration process, influent flows into tank 10 and passes through the pile cloth filter media on opposing sides of each submerged filter disk 20, depositing suspended solids on the filter media. The filtered effluent, which is considered clean to California Title 22 standard, flows out from a clean or filtered water outlet 25 of each filter disk 20 to a manifold having inlet fittings 14 for receiving clean water for ultimate discharge or other suitable use. This external manifold has isolating valves for each disk allowing for disk removal if required.

Figure 4:
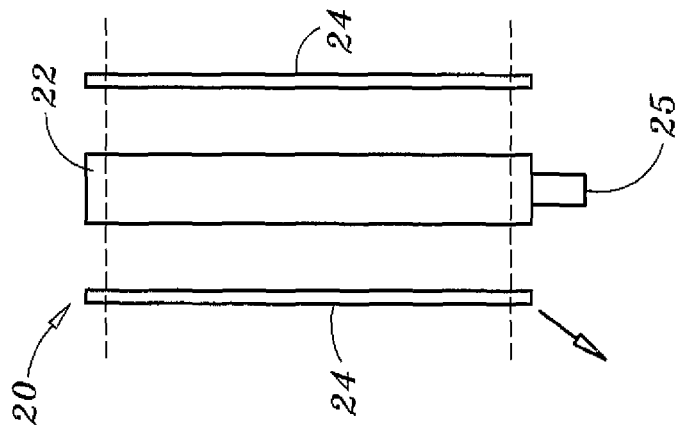
FIG. 4 is an exploded view thereof.
Figure 3:
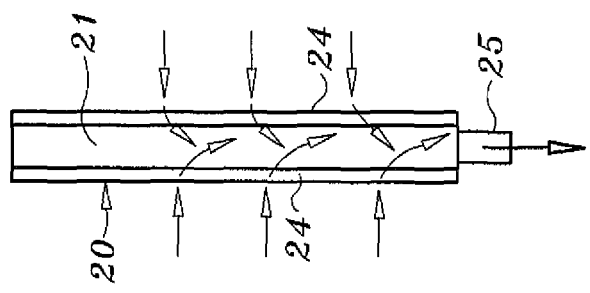
FIG. 3 is a sectional side view thereof illustrating water flow during the filtration process.
Figure 2:
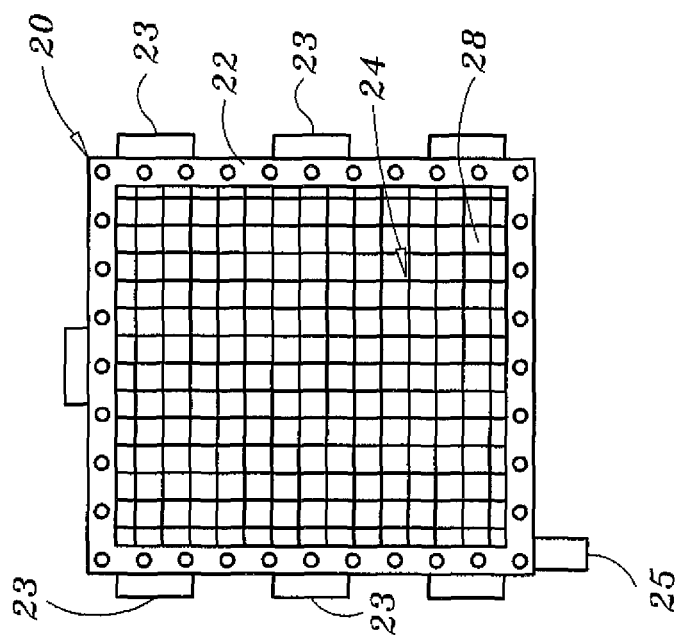
FIG. 2 is a face view of a filter disk in accordance with the present invention.
Figure 5:
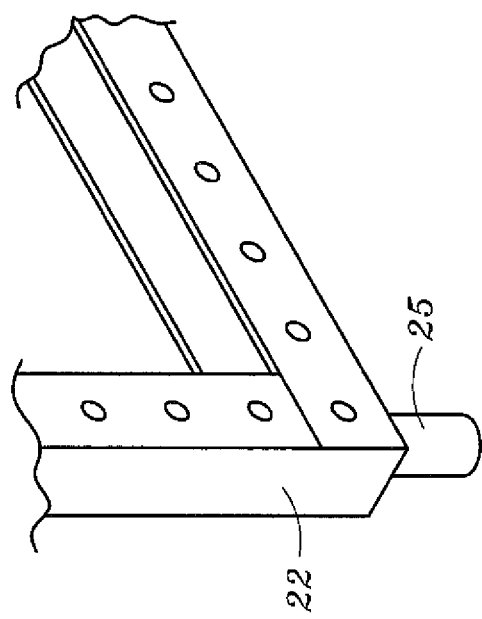
FIG. 5 is a partial perspective view of the filter disk frame.
Figure 10:
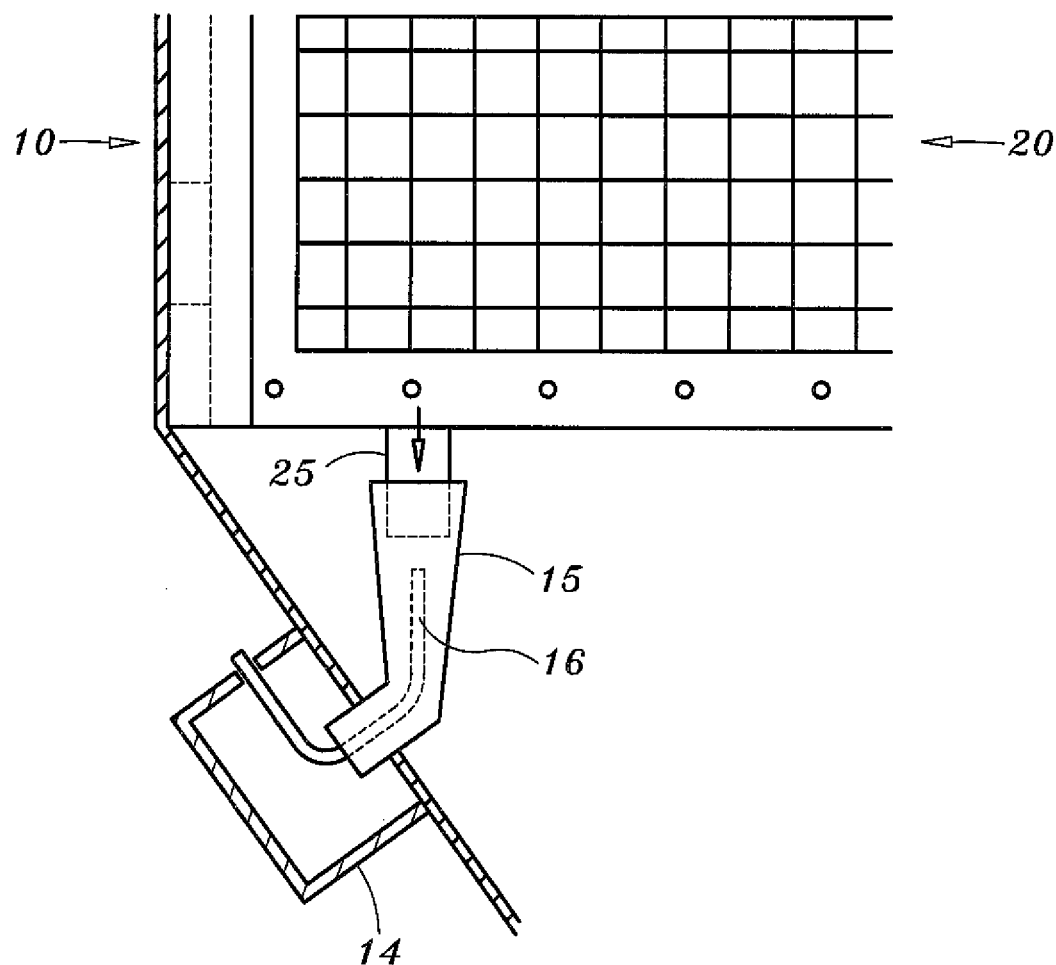
FIG. 10 is a partial side view of the lower portion of a filter disk assembly installed within a filter tank providing a detailed view of one embodiment of the clean water outlet and compressed air backwash connections.

FIGS. 2-6 depict a tertiary filter media disk 20 in accordance with the present invention. Each filter media disk 20 includes a peripheral frame 22 and a pair of filter panels, generally referenced as 24, mounted to the frame in generally opposing spaced face-to-face relation such that frame 22 and filter panels 24 bound an interior volume 21 as seen in FIGS. 3 and 4. As illustrated in FIG. 2, frame 22 further includes projecting guide bars 23 sized for removable inserted engagement within guide rails 12 in tank 10. A tubular filtered water outlet 25 is in fluid communication with the interior volume 21 to extract clean water that flows through filter media panels 24 into the interior volume. In a preferred embodiment, peripheral frame 22 is fabricated from U-shaped channel members connected to form a generally square or rectangular configuration as depicted in FIG. 5, with an overall thickness of approximately 3.0 inches. The filters preferably are effective in capturing particles as small as 5.0-10.0 microns. It should be noted, however, that the present invention may be practiced with filter disks formed in a variety of sizes and shapes. The ability of the present invention for use with filters of different shapes provides design flexibility that can not be achieved with suction backwash systems of the prior art that require a substantially flat surface for the vacuum head to engage so as to avoid drawing in water direction from the tank. In contrast, the present invention may incorporate filter shapes that are spherical, convex, concave, or any other shape.

Figure 6:
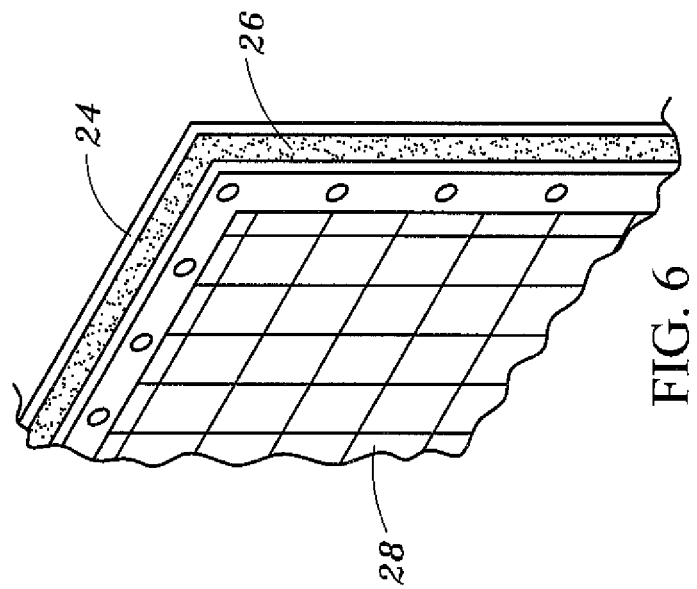
FIG. 6 is a partial perspective view of a filter panel.

Filter panels 24 are preferably constructed with a quantity of 13.0 mm pile cloth 26, shown in detail in FIG. 6, sandwiched between opposing mesh panels 28 as seen in FIG. 5. While the preferred embodiment discloses the use of pile cloth, alternate suitable filter media and types may be used in accordance with the present invention, including polyurethane material, polyester material, or any other suitable natural or synthetic material, cloth, belt, woven or non-woven material. Frame 22 further includes a handle 27 projecting from the top portion thereof to facilitate insertion and removal of the filter media disk 20.

With further reference to FIG. 1, after a period of time the accumulation of solids on the filter media reduces outlet flow thereby causing the water in the tank to rise from the normal water level, referenced as H-1, to an elevated level, referenced as H-2. The rise in water level provides an indication that the cloth filter media has been "blinded" with solids thus reducing flow through the filter media. A significant aspect of the present invention involves the use of backwashing technology that uses a compressed (or pressurized) fluid injected to the interior of each filter disk thereby generating reverse flow across the filter media to dislodge accumulated solids. Suitable compressed fluids include compressed air, pressurized liquid such as water (i.e. recirculation of final effluent), or any other suitable fluid, liquid or gas. In a preferred embodiment, the fluid comprises compressed air. The fluid may be compressed by a compressor, pump, blower, fan, by effect of gravity, or any other suitable means. Injecting a compressed fluid medium into the interior of each filter disk assembly increases the internal pressure within each filter disk thereby avoiding turbidity spikes associated externally applied suction backwash systems of the background art. FIG. 1 provides a detailed depiction of the connection of the clean water outlet 25 of filter disk 20 to a clean water manifold 14 having an inlet fittings 15 that each feed into a manifold on filter tank 10 for receiving clean water from each filter disk 20. In a preferred embodiment, inlet fitting 15 further incorporates a compressed fluid injection line 16 to allow for the introduction of a compressed fluid (e.g. compressed air) to the interior of filter disk 20 through water outlet 25. Incorporating injection line 16 with clean water inlet fitting 15 on tank 10 provides a single-point connection for both clean water flow and backwash fluid flow through filter outlet 25. This configuration greatly simplifies the overall structure of the filter tank system and eliminates all of the backwash components required by external suction backwash systems of the prior art, including motorized components required to drive the movable suction heads or rotatable filter disks. Inlet fitting 15 is preferably radially outwardly tapered and includes a rubber liner to form a water-tight seal.

FIGS. 8 and 9 depict a filter disk 20 including an internal corrugated baffle 29 disposed between opposing filter panels 24 in accordance with a first embodiment of the present invention. Corrugated baffle 29 is configured with the groove and ridge corrugations running in a generally horizontal direction for the purpose of creating a turbulent flow of compressed backwash fluid injected into the bottom of the filter disk to enhance backwash effectiveness. Creating a turbulent flow of compressed fluid functions to agitate the cloth filter media to more effectively dislodge accumulated solids therefrom. A further significant aspect of the present invention relates to improved filtration efficiency resulting from the gentle backwashing action. More particularly, it is believed that backwashing with compressed air (or other pressurized fluid) leaves a thin film of solids externally that improves filtration efficiency by allowing for the capture of finer particles, while avoiding the turbidity spikes that occur when the filter media is over cleaned as happens with the externally applied suction backwash systems of the prior art.

Figure 12:
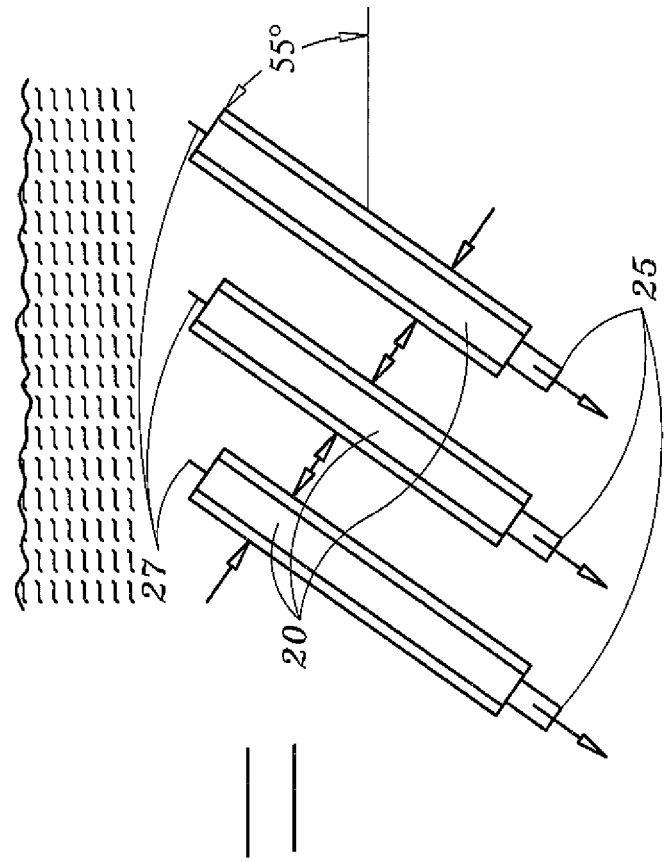
FIG. 12 depicts a plurality of inclined submerged filter disks.
Figure 11:
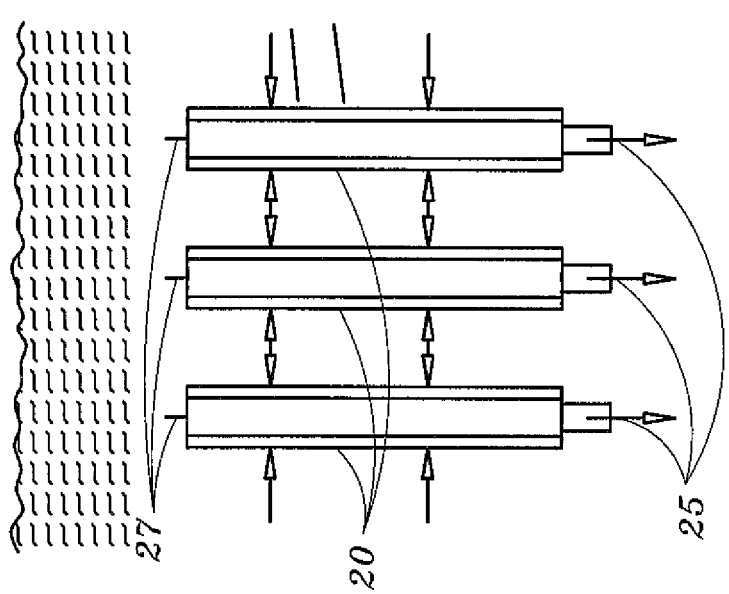
FIG. 11 depicts a plurality of vertically disposed submerged filter disks.

With reference now to FIGS. 11 and 12, the present invention contemplates configuring the plurality of filter disks 20 in either a generally vertically disposed configuration as shown in FIG. 11, or alternatively in an inclined configuration as shown in FIG. 12. When the filter disks are disposed in the inclined configuration seen in FIG. 12, system further harnesses the advantages of inclined plate technology (i.e. the Lamella effect) to enhance the efficiency of tertiary filtration by maximizing settlement velocity. In a preferred embodiment, filter disks 20 are disposed at an angle of approximately 55 degrees relative to horizontal, however, any suitable inclination angle is considered within the scope of the present invention.

Figure 13:
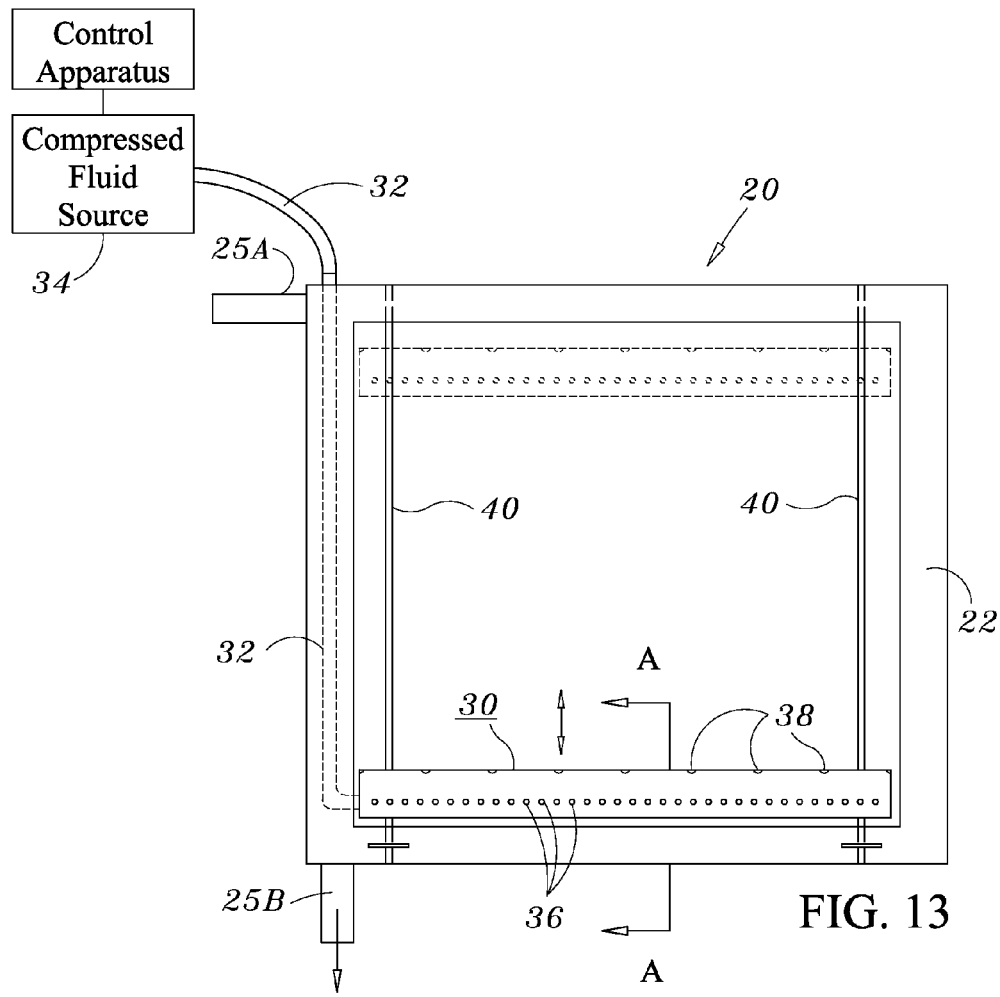
FIG. 13 is an elevational view of an alternate embodiment filter assembly adapted with a compressed air backwash system with a movable air diffuser.
Figure 14:
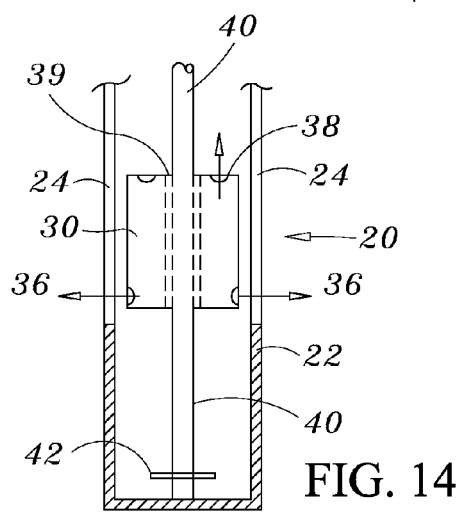
FIG. 14 is a partial sectional view thereof taken along section lines A-A of FIG. 13.

FIGS. 13-14 depict a further significant advancement relating to the use of a compressed fluid, such as compressed air or water, to achieve the removal of caked-on solids from the filter media. In accordance with this aspect of the present invention, tertiary media filter disks, generally referenced as 20, are each adapted with at least one internally disposed diffuser float, generally referenced as 30. Diffuser float preferably comprises an elongate, generally closed-ended hollow structure, that is in fluid communication with a compressed fluid (e.g. compressed air) line 32, which in turn is in fluid communication with a compressed air source 34. Diffuser float 30 preferably defines a plurality of through bores, including air backwash scouring bores 36 which function to expel compressed air in the general direction of the filter media 24 so as to agitate the media and dislodge accumulated caked solids therefrom. Diffuser float 30 further includes air pocket release apertures 38, defined along the top portion thereof. Air pocket release apertures function to allow for the escape of air from the diffuser float, particularly upon termination of the backwashing process as will be more fully discussed below. Diffuser float 30 is movably disposed within filter disk 20 and is preferably generally guided by a pair of guide bars 40 that pass through corresponding passageways 39 defined through diffuser float 30. Each guide bar 40 may further include a bushing 42 fixed in proximity to the bottom of the guide bar which functions as a stop to limit the lower travel of the diffuser float.

Diffuser float 30 functions to remove caked on solids that result in reduced flow through the filter media thereby leading to an increase in the tank water level, e.g. from the normal level (H-1) to the high water level (H-2) as illustrated in FIG. 1. The cloth filter media collects solids on the external surface as solids are deposited thereon as water passes through the cloth under hydrostatic pressure. As the solids accumulate, flow through the filter is reduced thereby causing the water level in the tank to rise and the volume of water entering the tank begins to exceed the volume of filtered water leaving the tank. When the water reaches the high level mark (H-2), the compressed air source 34 is automatically activated by system controls thereby supplying pressurized air to diffuser float 30 via compressed air line 32. Compressed air enters diffuser float 30 whereafter it is discharged via air backwash scouring through bores 36 toward the inner surfaces of filter panels 24 whereby solids which have accumulated on the filter media are dislodged. Diffuser float 30 is preferably disposed in close proximity to the inner surfaces of opposing filter panels 24 so as to maximize effectiveness. As the compressed air bursts through the cloth it creates an air scour effect on the outer surface of the cloth that has been found to be effective in dislodging solids. The dislodged solids then settle to the bottom of the tank, with the settlement velocity maximized in accordance with the LAMELLA effect due to the inclined orientation of the filter disks within the tank as illustrated in FIG. 12. A further significant aspect of the present invention involves use of buoyancy to propel the diffuser float within the filter disk without the need for other driving apparatus (such as motors etc.). More particularly, the introduction of air renders diffuser float 30 buoyant, such that the diffuser float ascends along guide bars 40 thereby exposing substantially the entire face of the filter panels to backwash scouring as the diffuser float traverses from the its lowermost position shown in FIG. 13 (solid line) to an uppermost position as shown in FIG. 13 (phantom depiction).

In a preferred embodiment, the backwashing process terminates after the diffuser float has fully traversed the entire face area thereby terminating the supply of compressed air. Termination may be controlled by time, or limit switch. With the supply of compressed air terminated, any remaining air within the diffuser float is allowed to escape via air pocket release apertures 38 thereby rendering diffuser float non-buoyant such that it automatically returns to its lowermost position under the influence of gravity whereby the diffuser float is positioned to initiate the next backwash cycle. The time period between backwash cycles will typically range between 30 minutes and 3.0 hours. As should now be apparent, diffuser float 30 remains at the lowermost position while the filter disk functions to collect solids from water passing therethrough and until the initiation of a backwash cycle causes the introduction of compressed air. In addition, one or more, but less than all, filter disks may activated during a single backwashing cycle. Finally, filtered water outlet 25, may be located in any suitable position, including a top mounted side discharge configuration 25A and a bottom mounted downward discharge configuration 25B as illustrated in FIG. 13.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A wastewater treatment apparatus comprising:
a tank having a wastewater inlet;
said tank having an open top and including opposing sides, each side having filter receiving guide rails affixed thereto, said guide rails being angularly disposed relative to horizontal;
a filter disk disposed within said tank;
said filter disk slidably removably received within said guide rails;
said filter disk including filter media and defining an interior volume, whereby hydrostatic pressure causes water within said tank to pass through said filter media and into said interior volume, said filter disk having a filtered water outlet in fluid communication with said interior volume;
means for removing accumulated solids from said filter media by the introduction of compressed fluid within said interior volume; and
said means for removing accumulated solids includes a diffuser float disposed within said internal volume, said diffuser float in fluid communication with a compressed fluid source.

2. A wastewater treatment apparatus according to claim 1, wherein said diffuser float comprises an elongate, generally closed-ended tubular structure defining a plurality of through bores, including through air backwash scouring bores disposed to expel compressed fluid in the general direction of said filter media, and at least one air pocket release aperture defined along the top portion thereof.

3. A wastewater treatment apparatus according to claim 1, further including at least one guide rod for guiding said diffuser float, said guide rod disposed in generally parallel relation with said filter media.

4. A wastewater treatment apparatus comprising:
 a tank having a wastewater inlet in communication with a tertiary wastewater supply;
 said tank defining a top opening and including opposing sides, each side having filter receiving guide rails affixed thereto, said guide rails being angularly disposed relative to horizontal;
 a filter disk disposed within said tank;
 said filter disk slidably removably received within said guide rails;
 said filter disk including filter media and defining an interior volume, whereby hydrostatic pressure causes water within said tank to pass through said filter media and into said interior volume, said filter disk having a filtered water outlet in fluid communication with said interior volume; and
 means for removing accumulated solids from said filter media by the introduction of compressed fluid within said interior volume, including a diffuser float disposed within said interior volume and in fluid communication with a compressed fluid source, said diffuser float comprising an elongate, closed-ended tubular structure defining a plurality of through bores, including bores disposed to expel compressed fluid in the general direction of said filter media, and at least one air pocket release aperture defined along the top portion thereof.

5. A wastewater treatment apparatus according to claim 1, wherein said filter disk interior volume includes a baffle.

6. A wastewater treatment apparatus according to claim 5, wherein said baffle is corrugated to create turbulent internal flow of backwash medium.

7. A wastewater treatment apparatus according to claim 1, wherein said diffuser float is buoyant when filled with air, and non-buoyant when not filled with air.

8. A wastewater treatment apparatus comprising:
 a wastewater tank having a wastewater inlet;
 a plurality of filter disks removably received within said tank, said filter disks disposed in generally spaced side-by-side generally parallel relation with each of said filter disks angularly disposed relative to horizontal;
 each of said filter disks including filter media and defining an interior volume, whereby hydrostatic pressure causes water within said tank to pass through said filter media and into said interior volume, each of said filter disks further having a clean water outlet in fluid communication with the corresponding interior volume of the filter disk;
 each of said filter disks further including a diffuser float disposed within the interior volume thereof and movable between lower most and upper most positions;
 said diffuser float comprising a generally elongate hollow body defining a plurality air backwash scouring through bores disposed to expel air toward said filter media, and at least one air pocket release aperture defined along the top portion of said diffuser float;
 a compressed air source in fluid communication with each diffuser float;
 control apparatus for selectively activating and deactivating said compressed air source, said compressed air source supplying pressurized air to at least one of said diffuser floats when activated and not supplying pressurized air to said at least one diffuser float when deactivated;
 whereby activation of said compressed air source supplies pressurized air to at least one of said diffuser floats thereby rendering said at least one diffuser float buoyant such that said at least one diffuser float traverses from its lower most position to its upper most position while expelling air toward said filter media; and
 whereby deactivation of said compressed air source renders said at least one diffuser float non-buoyant such that said at least one diffuser float returns to said lower most position under the influence of gravity.

\* \* \* \* \*